United States Patent [19]

Houser

[11] Patent Number: 5,327,806
[45] Date of Patent: Jul. 12, 1994

[54] APPARATUS FOR SHEAR-CUTTING A STACK OF AMORPHOUS STEEL STRIPS

[75] Inventor: William K. Houser, Greeneville, Tenn.

[73] Assignee: General Electric Company, Schenectady, N.Y.

[21] Appl. No.: 49,611

[22] Filed: Apr. 19, 1993

Related U.S. Application Data

[63] Continuation of Ser. No. 861,122, Mar. 31, 1992, abandoned.

[51] Int. Cl.$^5$ .............................................. B26D 1/08
[52] U.S. Cl. ........................................ 83/636; 83/694; 76/DIG. 11
[58] Field of Search ................................ 83/636, 694; 76/DIG. 11

[56] References Cited

U.S. PATENT DOCUMENTS

| | | | |
|---|---|---|---|
| 4,705,124 | 11/1987 | Abrahamson et al. | 76/DIG. 11 X |
| 4,942,798 | 7/1990 | Taub et al. | 83/636 |
| 4,947,945 | 8/1990 | Griffin | 175/409 |
| 4,971,485 | 11/1990 | Nomura et al. | 408/144 |
| 5,068,148 | 11/1991 | Nakahara et al. | 76/DIG. 11 X |

OTHER PUBLICATIONS

Two-page document from Fansteel Hydro Carbide, Latrobe, Pa., comprising one page entitled "Grade Specifications" and a second page entitled Properties and Applications. Received by applicant in Feb. 1991. One-page document prepared by or for Fansteel Hydro Carbide, Latrobe, Pa., entitled "Preliminary-Grade Specification", refers to HC-US16 material and shows a date of Feb. 1, 1989. Publication status unknown. Received by Applicant in Dec. 1991.

Wilson, "Tool Engineers Handbook", 1950, published by McGraw-Hill, pp. 14-12 through 14-14.

Primary Examiner—Eugenia Jones
Attorney, Agent, or Firm—William Freedman

[57] ABSTRACT

For shear-cutting a stack of thin strips of amorphous steel along a cutting plane that extends transversely of the stack, an apparatus that comprises two blades that are positioned at the start of a cutting operation on opposite sides of the stack is utilized. Each of the blades has a first surface for engaging one side of the stack and a second surface extending transversely of the first surface and generally parallel to said cutting plane and intersecting the first surface at a corner. The first surface of each blade is disposed at a predetermined rake angle with respect to a reference plane extending through a point on the corner of the blade and normal to said cutting plane. The apparatus is further characterized by the following features that cooperate to impart to the blades an exceptionally high resistance to wear: (i) the sum of the rake angles is of a negative value and between 5 and 35 degrees, and (ii) both blades are of a cemented carbide cutting material that consists essentially of tungsten carbide particles and cobalt particles compacted under high pressure and sintered at a temperature exceeding the melting point of the cobalt, the tungsten carbide particles being, on average, of submicron size and the cobalt constituting more than 15 percent and about 16 percent by weight of the cutting material.

6 Claims, 2 Drawing Sheets

APPARATUS FOR SHEAR-CUTTING A STACK OF AMORPHOUS STEEL STRIPS This is a continuation of co-pending application Ser. No. 07/861,122 filed on Mar. 31, 1992, now abandoned.

TECHNICAL FIELD

This invention relates to apparatus for shear-cutting a stack of thin strips of amorphous steel.

BACKGROUND

Amorphous steels are extremely hard materials and have presented considerable problems in shear-cutting because of excessive wear of the blades used for effecting the shear-cutting. Such wear is characterized by the blades either becoming dull or chipping or both as the shear-cutting operations are repeated over and over again.

In U.S. Pat. No. 4,942,798-Taub et al, assigned to the assignee of the present invention and incorporated by reference herein, there is disclosed and claimed an improved form of shear-cutting apparatus that is characterized by reduced blade-wear as compared to prior shear-cutting apparatus. Taub et al achieve their improved results by using a special design of the shearing blades in which one or both of the blades has a negative rake angle. The blade material used by Taub et al is described in the patent as a conventional hard cutting material, such as cemented tungsten carbide. Specific materials disclosed are Carboloy Grades 895 and 883, which are cemented tungsten carbides containing 6 percent cobalt.

Taub et al describe one series of tests with such blades in which stacks of Allied-Signal Corporation's Metglas 2605-S2 amorphous steel, each stack containing 10 superposed strips, each strip about 0.001 inch thick, were shear cut with the blades until a blade failure occurred. Sixty thousand cuts of these 10-strip-thick stacks were achieved before a blade failure occurred.

While these results are quite good compared to those that had been achieved with prior shear-cutting apparatus, it should be noted that if the number of amorphous steel strips in each stack is increased to substantially greater than ten, there is a substantial decrease in blade life. For example, if the stack thickness is increased from ten to fifteen strips, the number of cuts that can be achieved before blade failure (using the blade design and blade materials disclosed in the Taub et al patent) decreases to an average of less than 10,000. There is a distinct need for blades that can shear-cut amorphous steel stacks of this increased thickness (i.e., 15 strips) with a greater number of cuts before any blade failure occurs.

SUMMARY

In carrying out my invention in one form, I provide shear-cutting apparatus that comprises a pair of relatively movable blades having a configuration and physical relationship to each other substantially as disclosed in the aforesaid Taub et al patent. But instead of using the specific blade materials disclosed in the Taub et al patent, I use for both of my blades a cemented carbide cutting material that consists essentially of tungsten carbide particles and cobalt particles compacted under high pressure and sintered at a temperature exceeding the melting point of the cobalt, the tungsten carbide particles being of submicron size before compaction and the cobalt constituting about 16 percent by weight of the cutting material. I have been able to achieve with such blades prior to any blade failure an average of about 35,000 or more cuts of a 15-strip-thick stack of the above-referenced 2605-S2 amorphous steel strip, each strip being about 0.001 inches in thickness.

BRIEF DESCRIPTION OF DRAWINGS

For a better understanding of the invention, reference may be had to the following detailed description taken in connection with the accompanying drawings, wherein:

FIG. 1 is taken along the line 1—1 of FIG. 2.

DETAILED DESCRIPTION OF EMBODIMENTS

Figure 1:
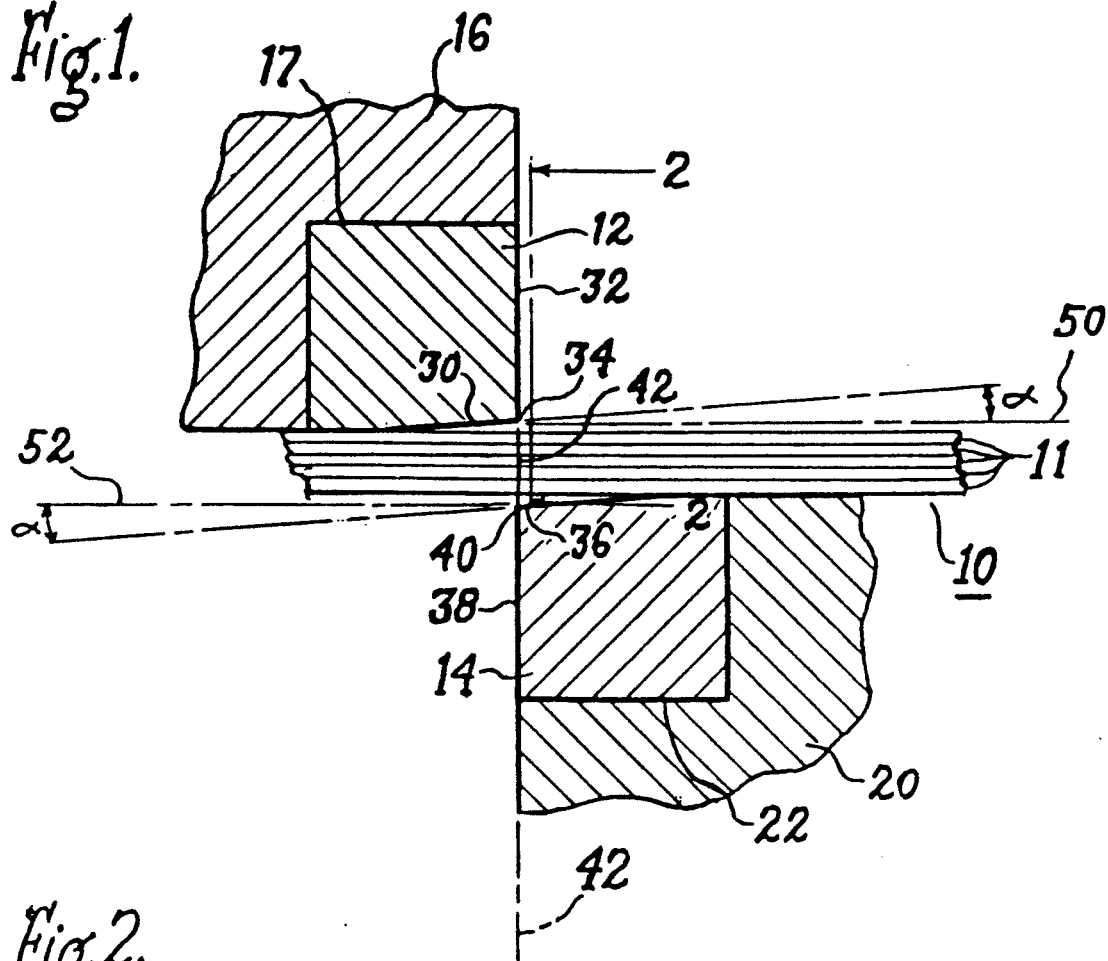
FIG. 1 is a cross-sectional view through the blades of cutting apparatus used for shear-cutting a stack of amorphous steel strips.

Referring now to FIG. 1, there is shown a stack 10 of amorphous steel strips 11 that is to be shear-cut by apparatus comprising two blades 12 and 14. Each of the blades is of a special cemented carbide material soon to be described in greater detail. The upper blade 12 is carried by a steel block 16 that contains a notch 17 in which the blade 12 is fitted and attached by a suitable bonding agent to the block. The lower blade 14 is carried by a similar steel block 20 that contains a notch 22 in which the blade 14 is fitted and attached by a suitable bonding agent to the block 20. In the illustrated embodiment, the lower block 20 is stationary and the upper block 16 is vertically movable, but the invention in its broader aspects is not so limited, e.g., both blocks could be movable, or the lower block instead of the upper one could be movable.

The upper blade 12 has two surfaces 30 and 32 which are disposed transversely of each other and intersect at a corner 34. The lower blade 14 likewise has two surfaces 36 and 38 which are disposed transversely of each other and intersect at a corner 40.

Cutting of the stack 10 is effected along a vertically-extending cutting plane 42 that extends transversely of the stack 10. The corners 34 and 40 of the blades are located on opposite sides of this plane 42 and in juxtaposition thereto. The blade surfaces 32 and 38 extend parallel to this cutting plane 42 and are also located on opposite sides of the cutting plane and in juxtaposition thereto. Blade surfaces 32 and 38 are located as close to the cutting plane 42 as reasonably possible.

At the start of a cutting operation, the blades 12 and 14 are located at opposite sides of the stack 10, as shown in FIG. 1. The blades are so positioned by suitable conventional positioning and actuating means 45, shown in block form in FIG. 3, coupled to the upper block 16. Cutting is effected by moving the upper blade downwardly so that the corner 34 moves downwardly toward corner 40 in a direction parallel to the cutting plane. Such movement first moves the stack downwardly into engagement with surface 36 of the lower blade and then bends the stack 10 slightly downward until the upper surface of the stack is engaged by the lower surface 30 of the upper blade; and then the upper corner 34 moves downwardly through the stack and past the lower corner 40, shear-cutting the stack along the cutting plane 42 in the course of such downward motion. This downward motion of the blade is effected by operating the actuating means 45.

The work-engaging surface 30 of the upper blade 12 is disposed at a negative rake angle with respect to a reference plane 50 that extends through a point on its corner 34 and is normal to the cutting plane 42 and also normal to the direction of movement of the upper blade 12. In the illustrated embodiment, this reference plane 50 is a horizontal plane.

Similarly, the work-engaging surface 36 of the lower blade 14 is disposed at a negative rake angle with respect to a reference plane 52 that extends through a point on its corner 40 and is normal to the cutting plane 42 and also to the direction of movement of the upper blade 12. In the illustrated embodiment, this reference plane 52 is also a horizontal plane.

The rake angle in a shear-cutting blade is considered to be negative if the work-engaging surface (e.g. 30) is so inclined as to make the corner (34) at the working edge of the blade less sharp than it would be if the work-engaging surface were located in the above-described reference plane (50).

In one embodiment of the invention, a negative rake angle of 10 to 15 degrees is used on each of the blades 12 and 14. Additional discussion of the rake angle appears hereinafter.

Figure 2:
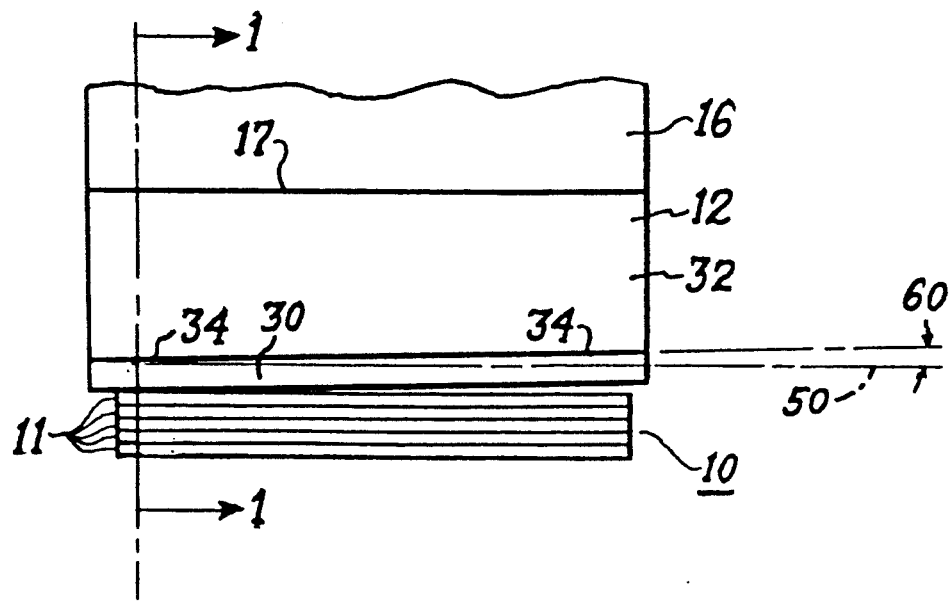
FIG. 2 is a side elevational view of one of the blades of FIG. 1 taken along the line 2—2 of FIG. 1.

In the embodiment of FIGS. 1 and 2, the upper blade 12 is also provided with a shear angle, which in the illustrated form of the invention is about two degrees. This shear angle is illustrated in FIG. 2 by the angle 60. The shear angle is the angle, as viewed in cutting plane 42, that the corner of the blade makes with references plane 50. By making this shear angle substantially greater than zero, the corner 34 of the blade can be made to enter the work more gradually along the length of the blade. In the illustrated embodiment, the lower blade has a zero degree shear angle, or, in effect, no shear angle.

Figure 3:
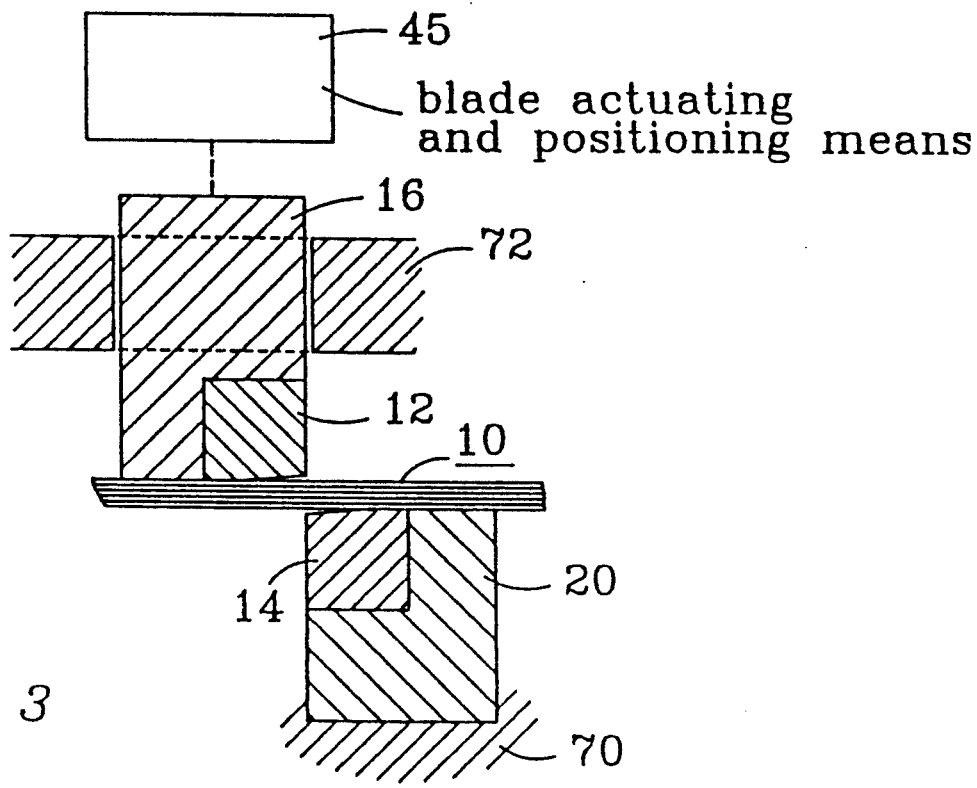
FIG. 3 is a schematic diagram of the cutting apparatus including the blades of FIG. 1.

It is important that the clearance between the surfaces 38 and 32 of the blades be kept as small as reasonably possible and maintained at a substantially fixed value during prolonged operation of the shear-cutting machine. To this end, the supporting framework for the blades and the blade supporting blocks 16 and 20 should be as stiff as feasible. This supporting framework is schematically illustrated in FIG. 3 at 70 and 72. Lower framework portion 70 holds the lower blade-supporting block 70 stationary, and upper framework portion 72 guides the upper block for vertical movement. In one embodiment, the clearance between surfaces 38 and 32 is 0.0005 inches.

Figure 4:
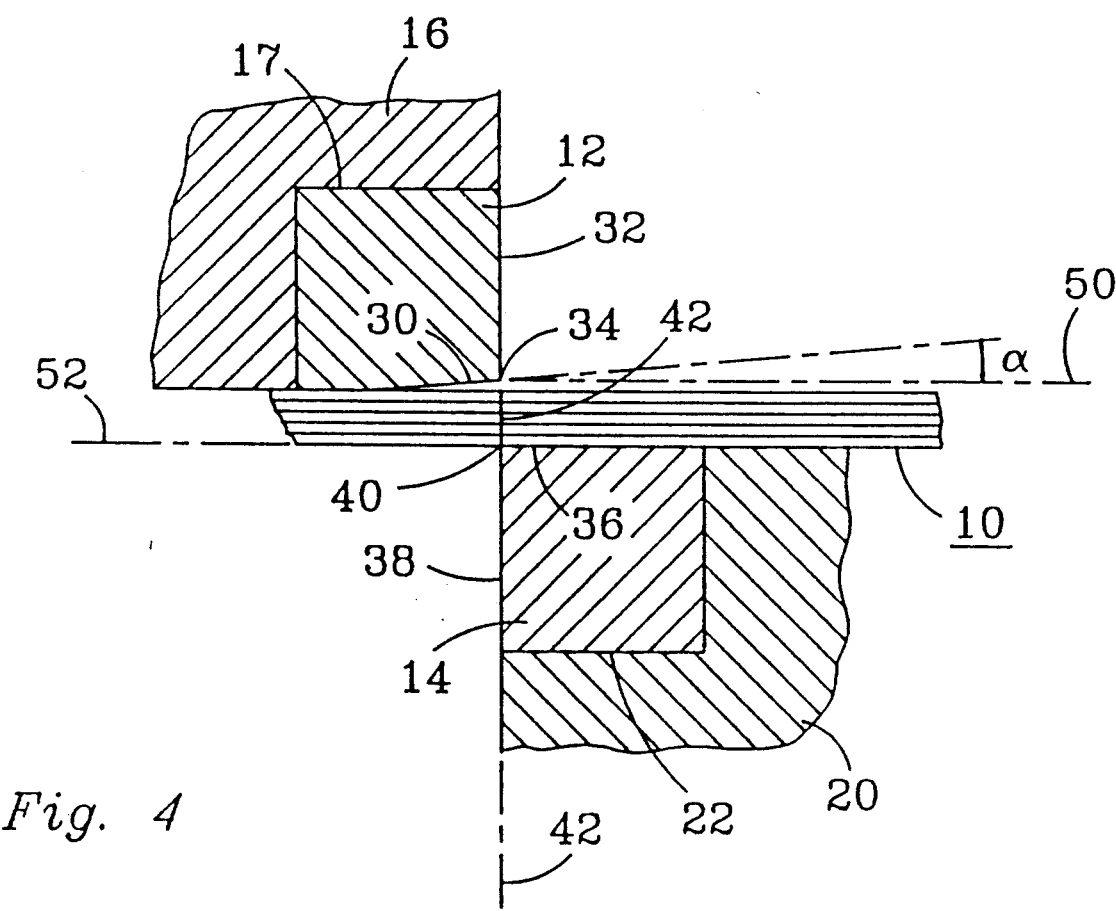
FIG. 4 is a cross-sectional view similar to that of FIG. 1 except showing a modified form of the lower blade.

As pointed out in the Taub et al patent, the negative rake angle present on the blades significantly contributes to longer wear life for the blades. In the embodiment of FIGS. 1-3 a negative rake angle is provided on both blades, but benefits of a negative rake angle can be derived even if only a single blade is provided with the negative rake angle. In this latter arrangement, illustrated in FIG. 4, the other blade is of a standard configuration, i.e., with a zero degree rake angle.

According to the Taub et al patent, in order for significant improvements in wear life of the blades to be derived from the use of negative rake angles in a shear-cutting application of this type, the sum of the rake angles present in the two blades should be a negative value of at least 5 degrees but no greater than about 35 degrees. The higher the total negative rake angle, the greater is the side thrust developed on the blades tending to separate them during a cutting operation. Unless this separation is limited to a very small value, the quality of the cut is materially impaired. For this reason, the maximum total negative rake angle should be about 35 degrees. A preferred rake angle for the blades is a negative rake angle of between 8 and 15 degrees for each blade.

As described in the aforesaid Taub et al patent, tests to determine blade life were made by Taub et al with shear-cutting apparatus corresponding to that disclosed hereinabove except having blades made of cemented tungsten carbide containing 6 percent cobalt (more specifically, with the top blade of Carboloy Grade 895 cemented tungsten carbide and the bottom blade of Carboloy Grade 883 cemented tungsten carbide). According to the Taub et al patent, these tests were performed on substantially identical stacks of amorphous steel strips, each stack containing 10 strips of Allied-Signal Corporations's Metglas 2605-S2 amorphous steel, each strip being about 3.3 inches wide and about 0.001 inch thick. The stacks were formed by effectively-continuous lengths of strip, superposed and aligned, as illustrated in FIGS. 1 and 2. The superposed, aligned strips were shear-cut along the plane 42 of FIG. 1, following which the superposed strips were advanced a predetermined distance along their length and again cut along a corresponding plane 42. Such operations were repeated over and over again until the cut quality as determined by inspection became unacceptable, thus indicating a blade failure. Each cut was performed by one downward stroke of the upper blade through the entire stack thickness, following which the blade was returned to its position of FIG. 1 in preparation for a new cutting operation.

Taub details one series of tests on the above-described 10-strip-thick stacks. In these tests, 6%-cobalt cemented tungsten carbide blades 12 and 14 corresponding to those illustrated and disclosed hereinabove, each having a negative rake angle of 15 degrees, were used for the cutting operations. (One blade was of Carboloy Grade 895 and the other blade, of Carboloy Grade 883.) Sixty-thousand (60,000) cuts were made with these blades before a blade failure occurred.

While these results are quite good compared to those that had been achieved with prior shear-cutting apparatus, it should be noted that if the number of amorphous steel strips in each stack is increased to substantially greater than ten, there is a substantial decrease in blade life. For example, if the stack thickness is increased from ten to fifteen strips, the number of cuts that can be achieved before blade failure (using the blade design and blade materials disclosed in the Taub et al patent) decreases to an average of less than 10,000.

I have been able to achieve without blade failure a far greater number of cuts through 15-strip-thick stacks of amorphous steel strip by using shear-cutting apparatus substantially as disclosed by Taub et al but differing in the following important respect. Both of my blades instead of being of the specific cutting materials used by Taub et al in their above-described tests were of a cemented tungsten carbide cutting material consisting essentially of tungsten carbide particles and cobalt particles compacted under high pressure and sintered at a temperature exceeding the melting point of the cobalt, the tungsten carbide particles having an average size less than one micron and the cobalt constituting about 16 percent by weight of the cutting material. This particular material is obtainable from the manufacturer Fansteel Hydro Carbide, Latrobe, Pa., as its HC-US16 cemented tungsten carbide. According to the manufacturer's specification, the composition of this material is 84 (±0.5) % tungsten carbide and 16 (±0.5)% cobalt. Its Rockwell A hardness is 90.8 (±0.7); its density is 13.85 (±0.15) grams/cc; and its transverse rupture strength is 500,000 pounds per square inch minimum. The average particle size of its tungsten carbide particles is 0 to 1 micron with some coarses up to 4 microns. It is noted that the figures in parentheses are variations from nominal values permitted by the manufacturer's specification. In using the terms "about" in the claims to define the percentage of a constituent present in the blade material or to define the hardness, density, or transverse rupture strength of the blade material, I intend to comprehend values within the range permitted by these variations.

Using this particular cutting material (i.e., the HC-US16) for both blades in the above-described shear-cutting apparatus, I have been able to achieve without blade failure an average of about 36,000 cuts through 15-strip-thick stacks of amorphous steel strip, each strip about 0.001 inches thick.

These excellent results were considered to be quite unexpected because other cobalt-containing cemented tungsten carbide cutting materials differing from the HC-US16 in ostensibly minor respects demonstrated much lower blade life in comparable tests. For example, using shear-cutting apparatus corresponding to that of FIGS. 1-3 but having one blade made of Fansteel Hydro Carbide's HC-US15 cemented carbide material and the other blade of the above-described HC-US16 material, I could effect an average of only about 17,000 cuts through the 15-strip-thick stacks prior to blade failure. This HC-US15 material, which is a cemented tungsten carbide material containing 14% cobalt, is described in more detail in Table I appearing hereinafter. Performance of the HC-US15 cemented carbide in the above combination, as well as in other combinations, is described in Table II appearing hereinafter.

As another example, using shear-cutting apparatus corresponding to that of FIGS. 1-3 but having both blades made of Kennametal K-94 cemented carbide material, I could effect, on average, only about 4,000 cuts through the 15 strip-thick stacks prior to blade failure. This cutting material, which is a cemented tungsten carbide material containing 11.5% cobalt, is available from Kennametal, Inc, Latrobe, Pa., and is described in more detail in Table I appearing hereinafter.

The following Table I summarizes properties of various representative cobalt-containing cemented carbide cutting materials that I have studied to determine blade wear when used in the apparatus of FIGS. 1-3 for cutting 15-strip-thick stacks of amorphous steel, each strip being about 0.001 inch thick.

TABLE I

| Brand:<br>Grade: | Carboloy<br>883 | Carboloy<br>895 | Kennametal<br>K 94 | Fansteel<br>Hydro Carbide<br>HC-US15 | Fansteel<br>Hydro Carbide<br>HC-US16 |
| --- | --- | --- | --- | --- | --- |
| WC (wt. %) | 94% | 94% | 88.5% | 86% | 84% |
| Co (wt. %) | 6% | 6% | 11.5% | 14% | 16% |
| Hardness (Rockw.A) | 91.7 to 92.2 | 92.5 to 93.1 | 89.8 | 89.8 | 90.8 |
| Density (gm/cc) | 15.0 | 15.0 | 14.20 | 14.15 | 13.85 |
| Transverse Rupture Strength (psi) | 290,000 | 260,000 | 380,000 | 425,000 | 500,000 (minimum) |
| Grain Structure (microns) | Medium<br>2.5 to 4.5 | Fine/Med.<br>1.0 to 4.0 | Med./Coarse<br>3.5 to 7.0 | Submicron<br>0 to 1 | Submicron<br>0 to1 |

The following Table II shows representative blade-wear performance of Table I materials when used for the blades of the apparatus of FIGS. 1-3 when cutting 15-strip-thick stacks of amorphous steel, each strip being about 0.001 inch thick.

TABLE II

|  | 883* | 895* | 883* | K94* | K94* | K94* |
| --- | --- | --- | --- | --- | --- | --- |
| Material | 883 | 895 | 895 | K94 | 883 | 895 |
| Average No. of Cuts Before Blade Failure | 9,000 | 9,000 | 8,000 | 4,000 | 7,000 | 6,000 |
| Lifetime Set-ups** | 11 | 6 | 211 | 3 | 5 | 4 |
| Loose-Blade Set-ups*** | 2 | 0 | 8 | 0 | 1 | 1 |

|  | HC-US15* | HC-SU15* | HC-US15* | HC-US16* | HC-US16* |
| --- | --- | --- | --- | --- | --- |
| Material | 883 | 895 | HC-US16 | 883 | HC-US16 |
| Average No. of Cuts Before Blade Failure | 11,000 | 21,000 | 17,000**** | 4,000 | 36,000 |
| Lifetime Set-ups** | 6 | 1 | 2 | 1 | 276 |

TABLE II-continued

| Loose-Blade Set-ups*** | 1 | 0 | 1 | 0 | 37 |
|---|---|---|---|---|---|

Notes Re Table II:
1. *Designates that one blade was of the numerator material and the other was of the denominator material.
2. Average number of cuts has been rounded to the next highest thousand.
3. **"Lifetime Set-ups" denotes the total number of set-ups for a particular cutting material combination in which the number of cuts was counted.
4. Where the set-ups for a particular cutting material combination have been carried out on a plurality of cutting machines, a figure representing the average number of cuts has been determined for each such machine, and these figures have been averaged together to establish the "Average No. of Cuts Before Blade Failure" shown in Table II.
5. ***"Loose-Blade Set-ups" denotes set-ups in which cutting was terminated because one of the blades became loose or fell completely off. The results of such set ups have not been included in calculating the average number of cuts unless such blade-loosening or fall-off occurred at a higher figure than the "Average No. of Cuts Before Blade Failure" for all "Lifetime Set-ups" for a particular cutting material combination in the same shear-cutting machine.
6. The figures for the HC-US16/HC-US16 combination are derived from commercial production data over a 9-month period.
7. ****This figure is based upon two set-ups. In one, cutting was terminated when the blade loosened at 27,658 cuts. In the other, blade failure occurred at a maximum of 6,000 cuts.

The cutting operations, referred to in the above Table II, were all performed with shear-cutting apparatus of substantially the form illustrated in FIG. 1–3 herein.

It will be apparent from Table II that a far greater number of cuts were achieved with both blades being of the 16% cobalt cutting material of the last column than with any of the other materials. I am unable to fully explain the reasons for the exceptional performance of the cutting material, but the high transverse rupture strength of the material, which is a measure of its toughness and, hence, its ability to resist chipping, is considered to be a significant contributing factor. This high transverse rupture strength is made possible by the relatively high percentage of cobalt present in the material, and the high percentage of cobalt is achievable without unduly diminishing the tungsten carbide content because of the very small average size of the tungsten carbide particles, i.e., submicron, or 0 to 1 micron. Tungsten carbide is the very hard component relied upon for cutting, and its content must be kept high to achieve effective cutting without undue dulling, or loss of sharpness, of the blades. In referring hereinabove to "chipping", I means the loss, or pull-out, of particles from the cutting edge of the blades during the cutting operations.

While Table II above shows that the "Average No. of Cuts Before Blade Failure" was about 36,000 where both blades were of the 16% cobalt material (HC-US16), it is noteworthy that some of the shear-cutting machines on which this data was obtained achieved much higher averages over prolonged periods of commercial production. For example, over one three-month period of commercial production, 20% of these shear-cutting machines averaged about 90,000 cuts and an additional 33% of these machines averaged about 60,000 cuts, all without blade failure, using the 16% cobalt material (HC-US16) for both blades.

In the illustrated embodiments, each of the blades is attached to its supporting block by a thin layer of adhesive applied to carefully machined and cleaned surfaces of the block and the blade and immediately thereafter scrubbed into place by gently rubbing the juxtaposed blade surface on the supporting surface. Thereafter, clamping pressure is applied to the blade while the adhesive dries and cures. An advantage of using an adhesive instead of brazing for attaching the blade is that the joining process involves no heat that can set up undesirable stresses in the blade due to the different coefficients of thermal expansion between the blade material and the block material. Such stresses can cause a premature failure of the joint between the blade and its supporting block. Another advantage of the adhesive over brazing is that the time to replace the blade. In one embodiment, the adhesive used is one available from Loctite Corp., Newington, Conn., as its Loctite 324 adhesive. This adhesive is applied after a suitable activator, such as Loctite 70715, is applied to the underlying surface, preferably by spraying.

While I have shown and described a particular embodiment of my invention, it will be obvious to those skilled in the art that various changes and modifications may be made without departing from the invention in its broader aspects; and I, therefore, intend herein to cover all such changes and modifications as fall within the true spirit and scope of my invention.

What I claim as new and desire to secure by Letters Patent of the United States is:

1. Apparatus for shear-cutting a stack of thin amorphous steel sheets along a cutting plane that extends transversely of said stack, comprising:
   (a) first and second blades each having a first surface for engaging said stack at one side thereof and a second surface that extends transversely of said first surface and generally parallel to said cutting plane, the first and second surfaces of each blade intersecting at a corner,
   (b) means for positioning said blades at the start of a cutting operation so that said corners are positioned at opposite sides of said stack and also on opposite sides of said cutting plane in juxtaposition thereto, and
   (c) means for moving one of said blades during a cutting operation so that the corner thereof moves toward the corner of the other blade in a direction parallel to said cutting plane, thereby causing the corners of said blades to shear-cut the stack along said cutting plane, and further characterized by:
   (d) said first surface of said one blade being disposed at a predetermined rake angle with respect to a reference plane extending through a point on the corner of said one blade and normal to said cutting plane and to the direction of motion of said one blade,
   (e) said first surface of said other blade being disposed at a predetermined rake angle with respect to a reference plane extending through a point on the corner of said other blade and normal to said cutting plane and to the direction of motion of said one blade,
   (f) the sum of said rake angles being a negative value of between 5 degrees and 35 degrees, and in which: the rake angle of either of said blades is considered to be negative if said first surface of the blade, in intersecting said second surface thereof at said corner of the blade, is so inclined as to make the corner less sharp than it would be if said first surface were located in said reference plane, and (g) both of said blades including their surfaces at said corners being of a cemented carbide cutting material that consists essentially of tungsten carbide particles and cobalt particles compacted under high pressure and sintered at a temperature exceeding the melting point of the cobalt, the tungsten carbide particles being, on average, of submicron size before compaction and constituting about 84 percent by weight of the cutting material, and the cobalt particles constituting more than 15 percent and about 16 percent by weight of the cutting material.

2. The apparatus of claim 1 in which said cemented carbide cutting material is characterized by a transverse rupture strength of at least about 500,000 pounds per square inch.

3. The apparatus of claim 2 in which said cemented carbide cutting material is characterized by a Rockwell A hardness of at least about 90.8.

4. The apparatus of claim 2 in which each of said blades has a negative rake angle of between 8 and 15 degrees.

5. The apparatus of claim 1 in which each of said blades has a negative rake angle of between 8 and 15 degrees.

6. The apparatus of claim 1 in which, as viewed from said cutting plane, one of said blades has a shear angle of several degrees as measured between the corner of said one blade and said reference plane of said one blade.

* * * * *